US012619691B2

(12) United States Patent  
Gundavelli et al.

(10) Patent No.: US 12,619,691 B2  
(45) Date of Patent: May 5, 2026

(54) EXTENDING EAP FOR SUPPORTING GENERATIVE AI CHALLENGES

(71) Applicant: Cisco Technology, Inc., San Jose, CA (US)

(72) Inventors: Srinath Gundavelli, San Jose, CA (US); Avinash Kalyanaraman, San Francisco, CA (US); Arman Rezaee, San Francisco, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 18/409,281

(22) Filed: Jan. 10, 2024

(65) Prior Publication Data

US 2025/0225217 A1 Jul. 10, 2025

(51) Int. Cl.  
*G06F 21/31* (2013.01)

(52) U.S. Cl.  
CPC ...... *G06F 21/31* (2013.01); *G06F 2221/2103* (2013.01)

(58) Field of Classification Search  
CPC ........... G06F 21/31; G06F 2221/2103; H04W 12/06; H04L 63/102; H04L 63/08; G06V 40/40  
See application file for complete search history.

(56) References Cited

U.S. PATENT DOCUMENTS 10,019,670 B2 * 7/2018 Gilbert ..................... G06N 5/02  
10,477,271 B1 11/2019 Higbee 11,455,431 B2 * 9/2022 Suresh .................... G06F 21/75  
11,537,694 B2 * 12/2022 Greenberger ........... G06F 21/31  
11,563,727 B2 * 1/2023 Kinai .................... H04W 12/06  
11,636,193 B1 * 4/2023 Plenderleith ........... G06F 21/78  
726/17

(Continued)

FOREIGN PATENT DOCUMENTS

WO WO2015000770 1/2015  
WO WO2020040634 2/2020  
WO WO2023014985 2/2023

OTHER PUBLICATIONS

Yunji Liang, Sagar Samtani, Bin Guo and Zhiwen Yu "Behavioral Biometrics for Continuous Authentication in the Internet of Things Era: an Artificial Intelligence Perspective" Published Jun. 22, 2020 www.ieee.org 17 pages.

*Primary Examiner* — Hosuk Song  
(74) *Attorney, Agent, or Firm* — Lee & Hayes, P.C.

(57) ABSTRACT

Techniques for extending EAP for supporting generative AI challenge-response for secure access are described. The techniques may be performed at least in part by an authentication server. An indication of a request for a user account to access the network resource via a user device is received. A determination that the user device supports generative AI challenge-response authentication id determined. A posture of the user device is determined. Based at least in part on the device posture, parameters for generating a generative AI challenge-response are determined. The parameters include at least one of a level of hallucination for, and a type of, challenge response to generate, and are transmitted to a generative AI engine. The generative AI challenge-response is received from the generative AI engine and caused to be output by the user device.

20 Claims, 11 Drawing Sheets

(56) References Cited

U.S. PATENT DOCUMENTS

| | | | |
|---|---|---|---|
| 11,768,966 B2 * | 9/2023 | Suresh | G06F 21/75 |
| | | | 726/22 |
| 12,254,077 B2 * | 3/2025 | Moe | G06T 11/00 |
| 12,259,986 B2 * | 3/2025 | Aslani | G06N 5/046 |
| 12,293,372 B2 * | 5/2025 | Rojas | G06Q 20/3825 |
| 2007/0214354 A1 | 9/2007 | Renaud | |
| 2010/0088262 A1 | 4/2010 | Visel et al. | |
| 2013/0133055 A1 | 5/2013 | Ali et al. | |
| 2015/0281882 A1 | 10/2015 | Tomaszewski, Sr. | |
| 2015/0346932 A1 | 12/2015 | Nuthulapati | |
| 2016/0342905 A1 | 11/2016 | Ghose et al. | |
| 2017/0317993 A1 | 11/2017 | Weber et al. | |
| 2018/0232384 A1 | 8/2018 | Leclerc et al. | |
| 2018/0365570 A1 | 12/2018 | Koukoumidis et al. | |
| 2019/0042894 A1 | 2/2019 | Anderson | |
| 2019/0228267 A1 | 7/2019 | Singh et al. | |
| 2020/0035030 A1 | 1/2020 | Schradin et al. | |
| 2021/0099458 A1 | 4/2021 | Su et al. | |
| 2021/0192140 A1 | 6/2021 | Galley et al. | |
| 2021/0297422 A1 | 9/2021 | McDorman et al. | |
| 2022/0141665 A1 | 5/2022 | Henry et al. | |
| 2022/0239644 A1 | 7/2022 | Jakobsson | |
| 2022/0284086 A1 | 9/2022 | Lin et al. | |
| 2023/0119109 A1 | 4/2023 | Choubey et al. | |
| 2025/0225216 A1 | 7/2025 | Kalyarnarman | |
| 2025/0225220 A1 | 7/2025 | Rezaee | |
| 2025/0225221 A1 | 7/2025 | Kalyanaraman | |

* cited by examiner

Figure 8:
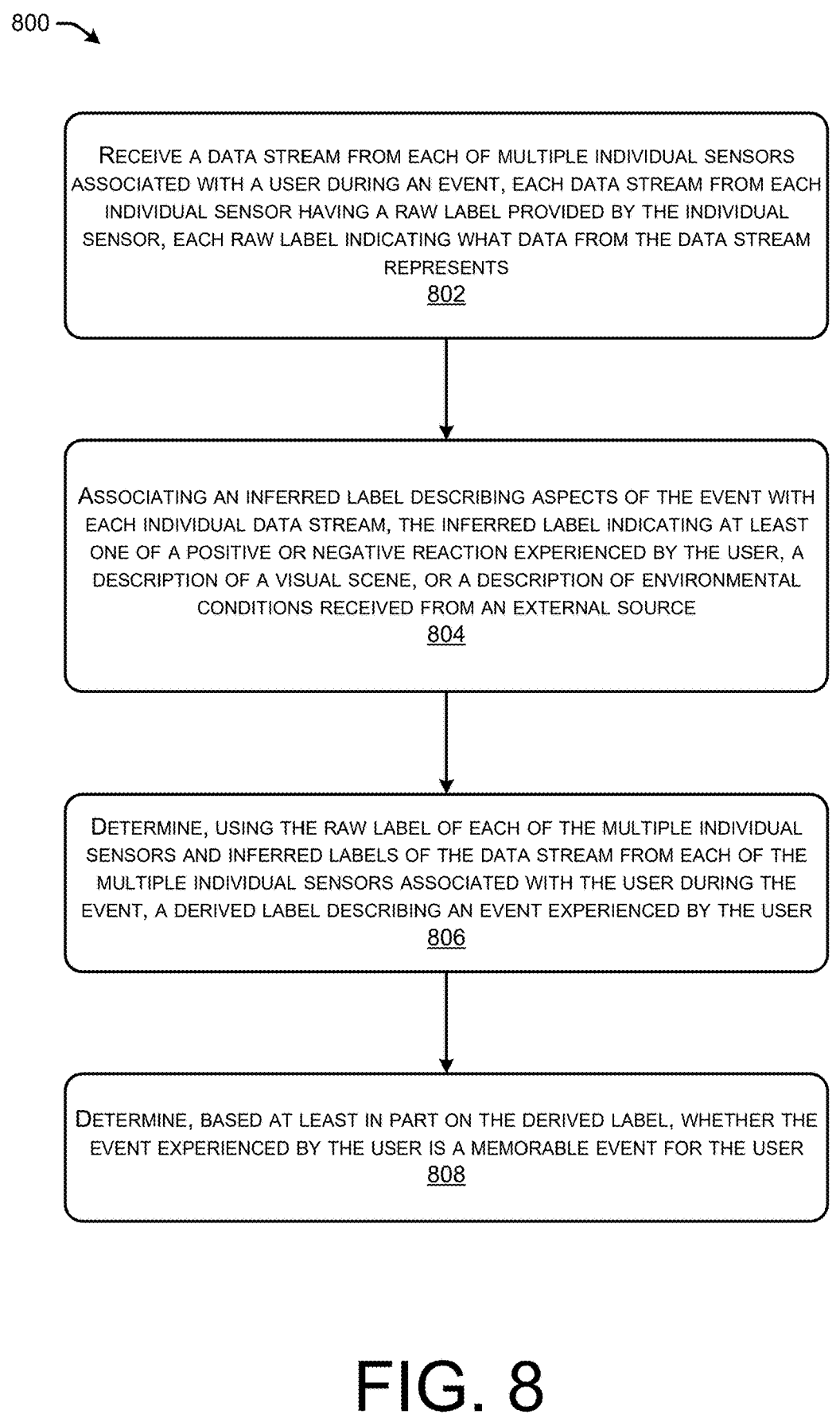

800 ⟍

RECEIVE A DATA STREAM FROM EACH OF MULTIPLE INDIVIDUAL SENSORS ASSOCIATED WITH A USER DURING AN EVENT, EACH DATA STREAM FROM EACH INDIVIDUAL SENSOR HAVING A RAW LABEL PROVIDED BY THE INDIVIDUAL SENSOR, EACH RAW LABEL INDICATING WHAT DATA FROM THE DATA STREAM REPRESENTS
802

ASSOCIATING AN INFERRED LABEL DESCRIBING ASPECTS OF THE EVENT WITH EACH INDIVIDUAL DATA STREAM, THE INFERRED LABEL INDICATING AT LEAST ONE OF A POSITIVE OR NEGATIVE REACTION EXPERIENCED BY THE USER, A DESCRIPTION OF A VISUAL SCENE, OR A DESCRIPTION OF ENVIRONMENTAL CONDITIONS RECEIVED FROM AN EXTERNAL SOURCE
804

DETERMINE, USING THE RAW LABEL OF EACH OF THE MULTIPLE INDIVIDUAL SENSORS AND INFERRED LABELS OF THE DATA STREAM FROM EACH OF THE MULTIPLE INDIVIDUAL SENSORS ASSOCIATED WITH THE USER DURING THE EVENT, A DERIVED LABEL DESCRIBING AN EVENT EXPERIENCED BY THE USER
806

DETERMINE, BASED AT LEAST IN PART ON THE DERIVED LABEL, WHETHER THE EVENT EXPERIENCED BY THE USER IS A MEMORABLE EVENT FOR THE USER
808

Figure 9:
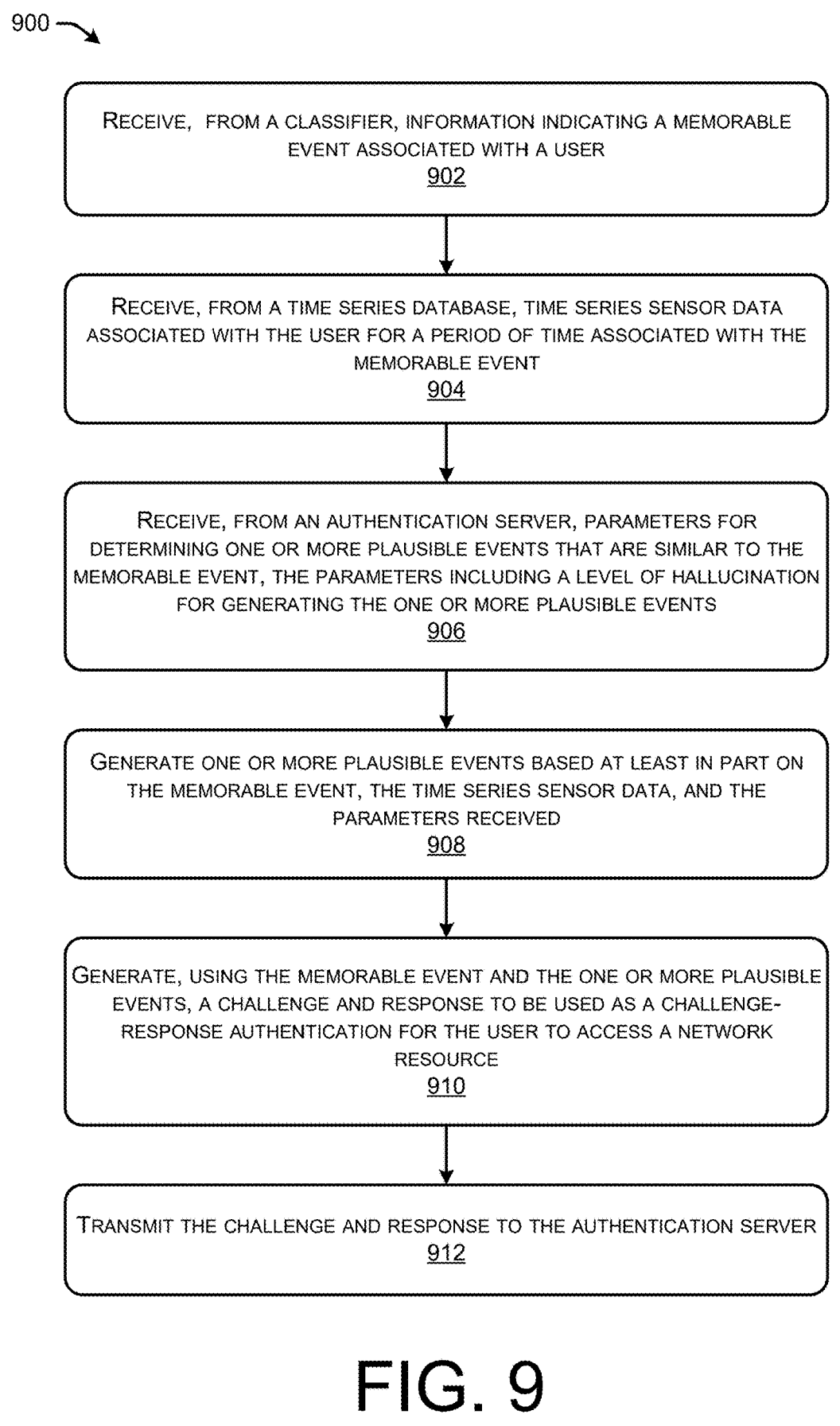

RECEIVE, FROM A CLASSIFIER, INFORMATION INDICATING A MEMORABLE
EVENT ASSOCIATED WITH A USER
902

RECEIVE, FROM A TIME SERIES DATABASE, TIME SERIES SENSOR DATA
ASSOCIATED WITH THE USER FOR A PERIOD OF TIME ASSOCIATED WITH THE
MEMORABLE EVENT
904

RECEIVE, FROM AN AUTHENTICATION SERVER, PARAMETERS FOR
DETERMINING ONE OR MORE PLAUSIBLE EVENTS THAT ARE SIMILAR TO THE
MEMORABLE EVENT, THE PARAMETERS INCLUDING A LEVEL OF HALLUCINATION
FOR GENERATING THE ONE OR MORE PLAUSIBLE EVENTS
906

GENERATE ONE OR MORE PLAUSIBLE EVENTS BASED AT LEAST IN PART ON
THE MEMORABLE EVENT, THE TIME SERIES SENSOR DATA, AND THE
PARAMETERS RECEIVED
908

GENERATE, USING THE MEMORABLE EVENT AND THE ONE OR MORE PLAUSIBLE
EVENTS, A CHALLENGE AND RESPONSE TO BE USED AS A CHALLENGE-
RESPONSE AUTHENTICATION FOR THE USER TO ACCESS A NETWORK
RESOURCE
910

TRANSMIT THE CHALLENGE AND RESPONSE TO THE AUTHENTICATION SERVER
912

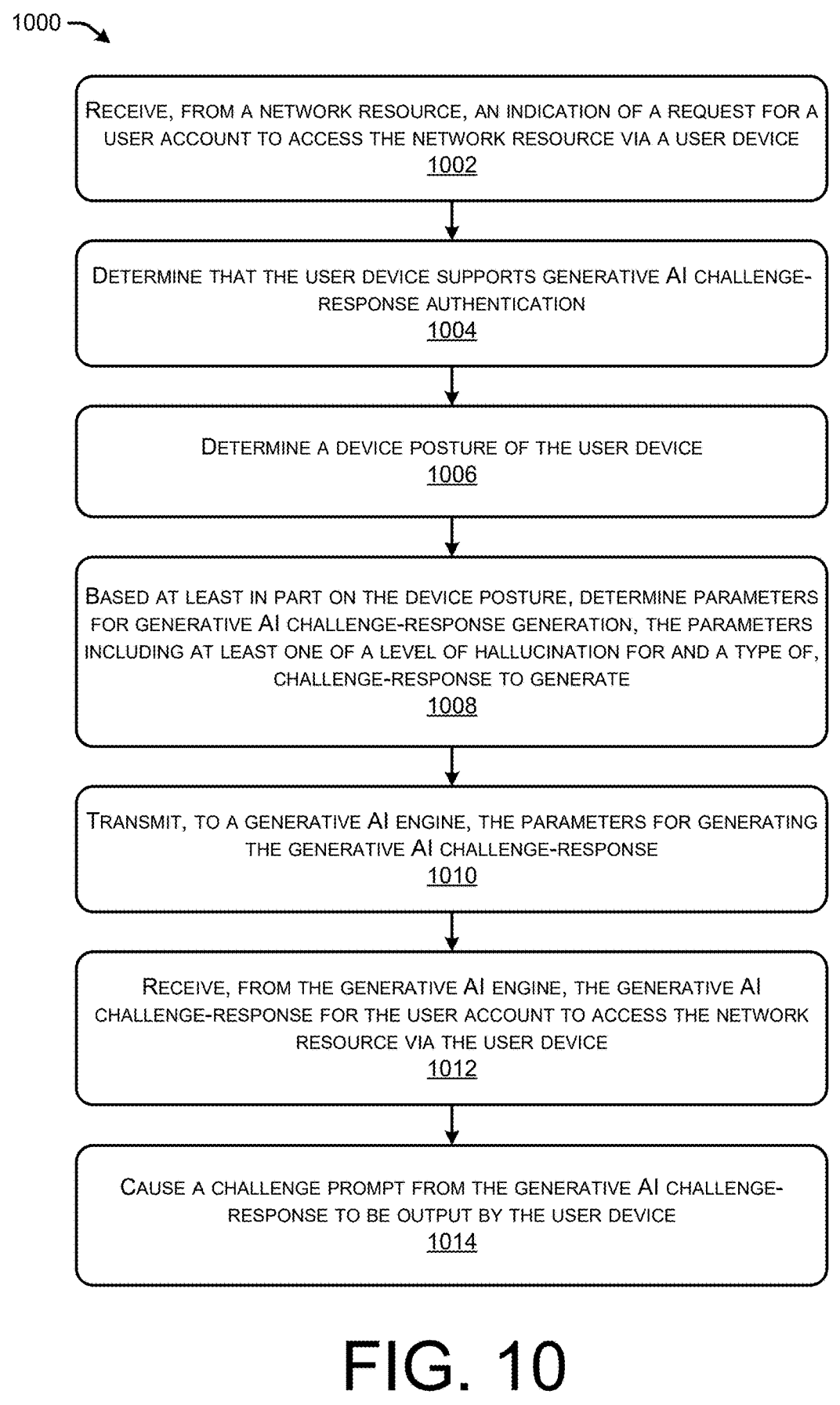

RECEIVE, FROM A NETWORK RESOURCE, AN INDICATION OF A REQUEST FOR A USER ACCOUNT TO ACCESS THE NETWORK RESOURCE VIA A USER DEVICE
1002

DETERMINE THAT THE USER DEVICE SUPPORTS GENERATIVE AI CHALLENGE-RESPONSE AUTHENTICATION
1004

DETERMINE A DEVICE POSTURE OF THE USER DEVICE
1006

BASED AT LEAST IN PART ON THE DEVICE POSTURE, DETERMINE PARAMETERS FOR GENERATIVE AI CHALLENGE-RESPONSE GENERATION, THE PARAMETERS INCLUDING AT LEAST ONE OF A LEVEL OF HALLUCINATION FOR AND A TYPE OF, CHALLENGE-RESPONSE TO GENERATE
1008

TRANSMIT, TO A GENERATIVE AI ENGINE, THE PARAMETERS FOR GENERATING THE GENERATIVE AI CHALLENGE-RESPONSE
1010

RECEIVE, FROM THE GENERATIVE AI ENGINE, THE GENERATIVE AI CHALLENGE-RESPONSE FOR THE USER ACCOUNT TO ACCESS THE NETWORK RESOURCE VIA THE USER DEVICE
1012

CAUSE A CHALLENGE PROMPT FROM THE GENERATIVE AI CHALLENGE-RESPONSE TO BE OUTPUT BY THE USER DEVICE
1014

FIG. 10

EXTENDING EAP FOR SUPPORTING GENERATIVE AI CHALLENGES

TECHNICAL FIELD

The present disclosure relates generally to techniques for, among other things, leveraging an AI driven system for determining memorable experiences of a user from real-world events throughout a given period of time, using hallucination for generating other plausible events based on the real events, and using the real memorable experience and plausible experiences to generate a challenge prompt for secure access.

BACKGROUND

Authentication is a critical component of digital security systems, serving as the first line of defense in verifying the identity of users, devices, or systems. Authentication mechanisms prevent unauthorized access to sensitive information and resources, and provide non-repudiation by preventing an involved party from denying their actions. Authentication is also a vital companion to various encryption mechanisms that maintain integrity and confidentiality of data during transmission.

In the past, user authentication systems were largely password based. However, passwords often fall into two extremes, they are either too simple resulting in weak, reused, or easily guessed passwords, making them susceptible to brute force dictionary attacks, or they are excessively complicated, leading to difficulties for users in memorizing them. A considerable number of security attacks result from suboptimal password practices. Weak passwords are accountable for a significant proportion of these attacks, granting hackers an easy path into sensitive systems.

Today, stronger security measures are taken using Multi-Factor Authentication (MFA) techniques, biometric or behavioral authentication, certificate-based authentication, hardware tokens or smart cards, etc. Biometric authentication uses unique physical characteristics such as fingerprints or iris scans for user identification. Behavioral authentication analyses user behavior, such as typing speed, mouse movements, or navigation patterns to create a user profile and if the user behavior deviates significantly from the profile, it is considered to be an indication of impersonation or unauthorized access. Biometric and behavior authentication methods have often been used to make a binary decision, in other words, does the biometric or behavior signal coming from the user match their pre-verified profile, yes or no?

Another type of security measure is Completely Automated Public Turing test to tell Computers and Humans Apart (CAPTCHA). These tests use a measure known as challenge-response authentication. A typical CAPTCHA test is made up of two simple parts, a randomly generated sequence of letters and/or numbers that appear as a distorted image, and a text box. A user must type the characters in the text box to pass the test and prove that they are a human. Traditionally, the challenge issued by an authentication server come from a predetermined and static corpus of "approved challenges." Additionally, given that these challenges are constructed based on general information, an AI system can easily produce the correct response. For example, a typical challenge may be "identify all squares with a bicycle," and an AI system with image processing capability can easily solve the challenge.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 is a flow diagram illustrating an example method associated with the techniques described herein for determining whether an event experienced by a user is memorable event.

FIG. 9 is a flow diagram illustrating an example method associated with the techniques described herein for generating a challenge-response for secure access of a network resource using a memorable event and one or more other plausible events generated using generative AI.

FIG. 10 is a flow diagram illustrating an example method associated with the techniques described herein for extending EAP for supporting generative AI challenges for secure access.

DESCRIPTION OF EXAMPLE EMBODIMENTS

Overview

Figure 1:
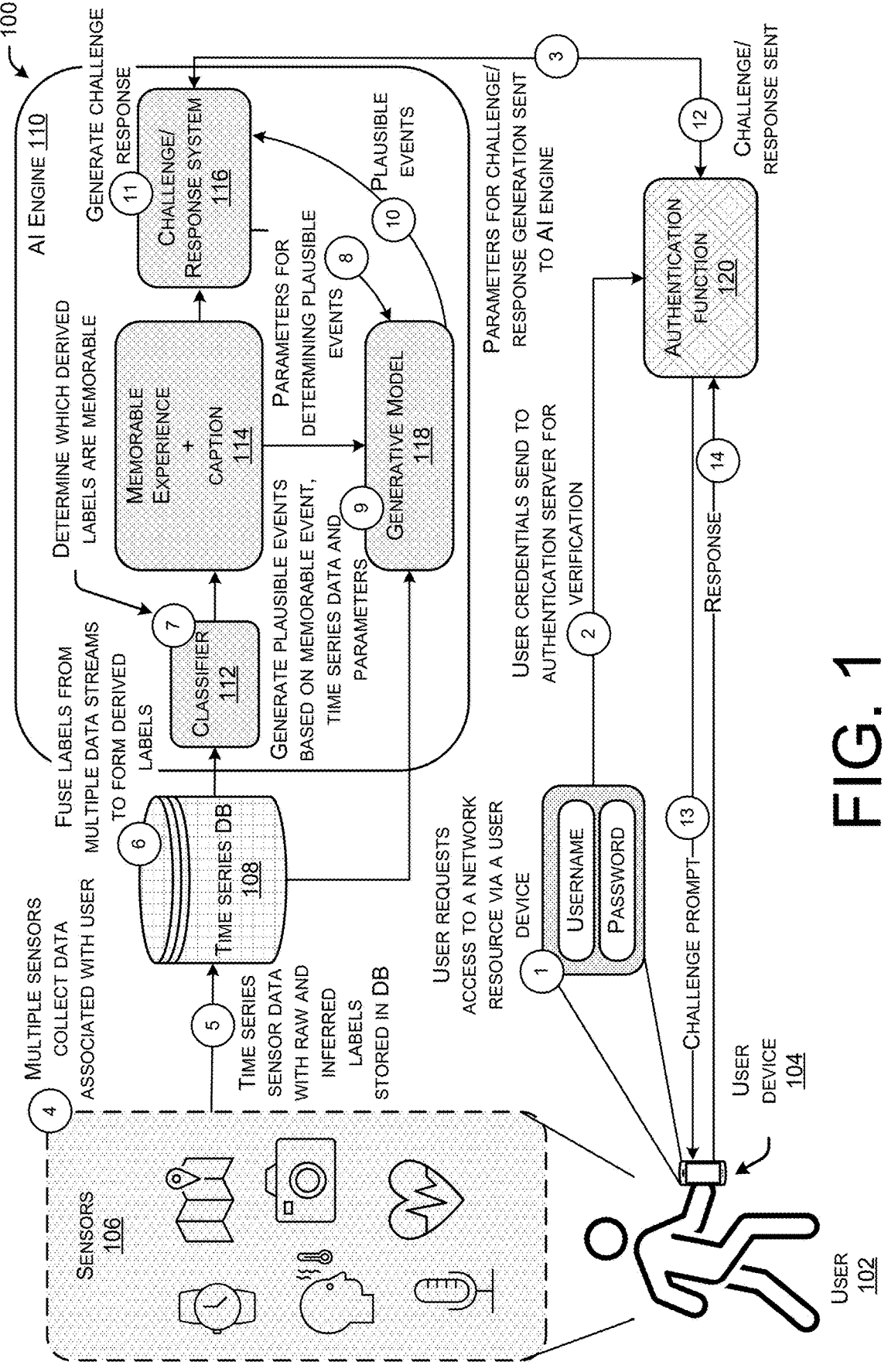
FIG. 1 illustrates an example architecture that may implement various aspects of the technologies directed to leveraging a memorable experience of a user for secure access to a network resource.

The present disclosure relates generally to techniques for determining a memorable event of a user, generating one or more other plausible events based on the memorable event and using generative AI, generating a generative AI challenge-response for secure access using the memorable event and the plausible events, and extending Extensible Authentication Protocol (EAP) for supporting generative AI challenges for secure access to a network resource.

A first method described here includes techniques for using an event associated with a user as an authentication factor. The method may include, receiving, from a user device associated with the user, an indication of a request for the user to access a network resource via the user device. The techniques may also include receiving, from a time series database, time series sensor data associated with the user, wherein the time series sensor data is a sequence of data points collected by one or more sensors associated with the user during real-world events that the user experiences during a period of time. The techniques may also include identifying, using the sensor data, a particular experience from the real-world events experienced by the user that is a memorable experience. The techniques may also include generating a challenge prompt associated with the memorable experience to authenticate an identity of the user. Finally, the techniques may include causing the user device to output the challenge prompt.

A second method described herein includes techniques for identifying an event as a memorable experience associated with a user. The techniques may include the techniques described herein may include, receiving a data stream from each of multiple user sensors associated with a user during an event, each data stream from each user sensor having a raw label provided by the user sensor, each raw label indicating what data from the data stream represents. The techniques may also include associating an inferred label describing aspects of the event with each user data stream, the inferred label indicating at least one of a positive or negative reaction experienced by the user, a description of a visual scene, or a description of environmental conditions received from an external source. The techniques may also include determining, using the raw label of each of the multiple individual sensors and inferred labels of the data stream from each of the multiple user sensors associated with the user during the event, a derived label describing an event experienced by the user. Finally, the techniques may include determining, based at least in part on the derived label, whether the event experienced by the user is a memorable event for the user.

A third method described here includes techniques for generating a generative AI challenge-response and may be performed at least in part by a generative AI engine. The method may include receiving, from a classifier, information indicating a memorable event associated with a user. The techniques may also include receiving, from a time series database, time series sensor data associated with the user for a period of time associated with the memorable event. The techniques may also include receiving, from an authentication server, parameters for determining one or more plausible events that are similar to the memorable event, the parameters including a level of hallucination for generating the one or more plausible events. The techniques may also include generating one or more plausible events based at least in part on the memorable event, the time series sensor data, and the parameters received. The techniques may also include generating, using the memorable events and the one or more plausible events, a challenge and response to be used as a challenge-response authentication for the user to access a network resource. Finally, the techniques may include transmitting the challenge and response to the authentication server.

A fourth method described here include techniques for extending EAP for supporting generative AI challenge-responses, the method may be performed at least in part by an authentication server. The techniques may include receiving, from a network resource, an indication of a request for a user account to access the network resource via a user device. The techniques may also include determining that the user device supports generative AI challenge-response authentication. The techniques may also include determining a device posture of the user device. Based at least in part on the device posture, the techniques may include determining parameters for generative AI challenge-response generation, the parameters including at least one of a level of hallucination for, and a type of, challenge-response to generate. The techniques may also include transmitting, to a generative AI engine, the parameters for generating the generative AI challenge-response. The techniques may also include receiving, from the generative AI engine, the generative AI challenge-response for the user account to access the network resource via the user device. Finally, the techniques may include, causing a challenge prompt from the generative AI challenge-response to be output by the user device.

Additionally, the techniques described herein may be performed as a method and/or by a system having non-transitory computer-readable media storing computer-executable instructions that, when executed by one or more processors, performs the techniques described above and herein.

Example Embodiments

As noted above, authentication is a critical component of digital security systems. However, enterprise networks struggle to offer authentication methods that are both secure and user-friendly. Passwords are often either too simple, making them vulnerable to hacking, or excessively complicated, leading to users having a difficult time in remembering them. Biometric or behavioral authentication is based on a binary decision determining if the biometric or behavioral signal coming from the user matches a pre-verified profile of the user. However, even a small injury can at least temporarily change behavioral movements of a user, leading to inaccurate authentication. Additionally, the behavior of a user typically changes over a period of time, rendering the pre-verified behavioral profile of a user no longer accurate. Biometric identifiers of a user are unique. However, biometric identifiers are also permanent and cannot be changed if compromised, unlike a password or PIN. This also raises significant concerns about the potential violation of privacy and the risk of data breaches. In addition, the collection and storage of biometric data can lead to unauthorized tracking and profiling. MFA techniques are also used in the authentication process. While the goal of MFA is to present multiple defenses that make it more difficult for an unauthorized person to access a target, there are still situation in which a perpetrator is able to get around the multiple layers of defense. One popular way in which hackers get around MFA is MFA fatigue where an endless stream of push requests is designed to break down the target's cybersecurity posture and inflict a sense of "fatigue" regarding a push requests. Ultimately the target may become so overwhelmed that they accidentally approve or accept an MFA request to stop the endless stream of notifications they are receiving.

This disclosure is directed to techniques that, among other things, leverages the use of human memory as a biometric and the unique memorable experiences of a user that happens during a period of time as a form of multi-factor authentication using generative Artificial intelligence (AI). Thus, the issues with biometrics being permanent and typical biometric issues with privacy violation and unauthorized tracking and profiling do not apply, as each memory used for memory biometric authentication will be different and cannot lead to unauthorized tracking and profiling of the user. In addition, although the memorable experience is used as an MFA, there is no push notification leading to an inadvertent authorization.

Various techniques described herein leverage a challenge-response mechanism in conjunction with biometric and behavioral profiles to authenticate users. A server issues a challenge to the client and the client uses this challenge along with privately held information (e.g., secret key) to respond to the challenge for authentication. Traditionally, challenges in this type of system come from a predetermined and static corpus of "approved challenges" (similar to how CAPTCHA is used today). However, the techniques described herein leverage various biometric and behavioral signals to identify "memorable experiences" from the daily activity of a user that are used as a subset of these "memorable experiences" as the privately held information used in the challenge-response mechanism. Generative AI is used to create the challenges based on biometric/behavior data, as well as other environmental signals and sensor data.

To implement techniques described herein, sensors associated with a user may collect sensor data from multiple sensors during real-world events experience by the user and store the sensor data in a time series database. A classifier of an AI engine can determine which of the real-world events qualify as positive memorable experience for the user. A generative AI model of the AI engine can use the sensor data and a memorable experience to generate other plausible experiences. A challenge-response system of the AI engine can then use the real memorable experience along with the generated plausible experiences to generate a challenge-response for an MFA. A challenge prompt may be sent to a user device prompting the user to provide the correct response relating to the real memorable experience and authenticate the user and grant secure access to a network resource as requested.

Every day a user may experience (see, hear, touch, taste, etc.) a series of events that are unique to the user. Of these experiences, events that a user tends to remember may be referred to as "memorable experiences." Sensors worn, carried, mounted on, or in some other way associated with the user can capture time series sensor data during these memorable experiences. Some commonly found sensors may include but are not limited to, cameras, microphones, heart rate monitors, GPS, inertial measurement unit (IMU) sensors, barometers, ambient light sensors, temperature sensors, oxygen saturation (SpO2) sensors, skin temperature sensors, iris scanner, sleep tracker sensors, etc. These sensors may supply a reasonably complete picture of the daily experiences of a user. From tracking the physical activity, biomarkers, and vital sign to the people a user interacts with or the physical spaces the user occupies, these sensors capture real-time data that may empower a user to make informed decisions about health, well-being, and daily routines. This disclosure describes techniques for identifying memorable events unique to a user by leveraging the sensors associated with the user. Such identified memorable events may then be used as a form of multi-factor authentication. By identifying memorable events, users can be queried such that only they know the answer to the posed queries as only they have experienced them.

The steps involved in identifying memorable events of interest in the daily life of a user involve, 1) data collection and labeling, 2) data fusion, and 3) classification (is the event memorable or not?). In the first step, the raw data is collected from the different sensors attached to a user (e.g., first person camera view from smart-glasses, location from GPS, heart rate from a smartwatch, audio signals from the microphone of a smart phone, etc.). Upon collection of the sensor data, labels are attached to each sensor data type. There are two labels attached, raw labels and inferred labels. Raw labels are those provided by the sensor itself (e.g., latitude and longitude information from the GPS). The inferred labels are inferred from the sensor stream. For example, an inferred label may relate to mood detection (e.g., happy, sad, angry etc.) and may be detected from voice data captured by the microphone, facial expressions from a camera, heart rate, iris dilation from an iris scanner, etc. Another example of an inferred label may be a scene recognition from the first-person camera view of the smart glasses (e.g., "looking at a skateboarder in the park" or "buying a teddy bear in the market"). In some examples, external data may be used to determine the inferred labels. For example, the user may not be associated with a sensor that collects data relating to the weather while they are on a hike. However, the user's smartphone may have GPS, thus, the fact that the weather was very rainy at the location and time of their hike may be easily obtained. The dreary rainy weather may then be used to determine the inferred label "soaking wet while hiking the Appalachian trail."

In the second step of data fusion, the labels above, from multiple sensors, are fused together to form derived labels. A derived label describes an event experienced by a user using the data from multiple sensors associated with the user during the time period of the event. Take a user eating lentils for lunch between 12 pm and 12:30 pm, for example. Fusing together the labels from sensor data collected from GPS, a watch, smart glasses, and a sweat sensor a derived label can be formed such as "spicy lentils for lunch at Spicy Ranch Restaurant". If this is the spiciest food the user has had in a long time, it may be a memorable event. Using the sweat sensor, and perhaps a microphone from a smart phone that hears the user comment that "these lentils are the spiciest lentils I think I've ever eaten!" The derived label, "spiciest lentils ever eaten for lunch at Spicy Ranch Restaurant on Monday" may be formed for the memorable event, which may then be used in a generative AI challenge-response for secure access to a network resource in the future. Derived labels/inferences are constructed by fusing data from multiple orthogonal sensing modalities. In addition, each derived tag includes appended metadata from the camera to indicate if the person was alone during the experience. This information is important when identifying memorable experiences unique to a user, and thus, exclusively known to the user, for authentication purposes.

In the third step an identification is made as to which of the derived labels determined above are "memorable" to the user. Numerous techniques can be employed to perform this classification. In one example, for each identified label, a determination is made whether the event has previously occurred during a predetermined window of time. In our above example of spicy lentil for lunch, If the user eats spicy lentils for lunch every Monday, the experience is most likely not very memorable. However, if the user has never had spicy lentils and, as in the example above, they are the spiciest food the user has eaten in a very long time, the experience is much more likely to be memorable. To determine whether an event has occurred in a previous time window, labels are mapped to a vector space, and sparse or singleton clusters are identified. As proximity in vector space denotes proximity in semantic meaning of the label, looking at sparse/singleton clusters shows infrequent labels that may be tagged as "memorable."

In another example, the series of derived labels representing events experienced by a user within a window of time (e.g., a day, a week, etc.) is fed into a neural network that is trained to identify "memorable events" from labels. The top-k outputs of this neural network lists a set of memorable events with a weight (probability a human remembers the event associated with the same). Still another example of identifying memorable events in the daily life of a user, involves multi-modal sensor fusion based classification. In such an approach, the raw sensor streams are directly passed into a neural network that is trained to identify memorable events.

Additionally, not all memorable experiences are appropriate for use in a generative AI challenge-response system. For example, some "memorable experiences" may be traumatic, for example, if a user's pet dies, or the user or a loved one gets a cancer diagnosis. Though most likely very "memorable" these events are not desirable for use in the generative AI challenge-response system and will thus be weeded out. To exclude memorable but traumatic experiences, Reinforcement Learning from Human Feedback (RLHF) may be relied upon, which relies on human feedback to steer the model into picking content that is not traumatic. In addition, some information involves privacy concerns such as information that falls under HIPPA regulations. Thus, when a user is at a medial location (determined by the GPS censor for example) the sensors associated with the user may stop collecting data in order to comply with privacy issues.

Once "memorable experiences" have been classified, a generative AI engine uses a memorable experience, as well as the time-series database of sensor data, to create "plausible experiences". The plausible experiences are AI generated experiences similar to a real memorable experience, except that a user who has experienced the memorable event will be able to differentiate between them.

The generative engine is designed to serve the needs of the challenge-response system. For instance, the challenge-response system may request to present a user with five images as a challenge, only one of which is an actual event that qualifies as a memorable experience to the user. The generative AI engine, or generative model, uses the sensor data corresponding to the actual memorable experience of the user and selects a single image/frame from one of the memorable experiences (as labeled by the classifier). The selected image is one the user will recognize. The generative AI engine will then generate four additional plausible images that do not match the experience of the user but are similar (to varying degrees) and the user will be able to refute them. Plausible image generation is an example and not a limitation. The real memorable experience and the generated plausible experiences may also be presented in text form, audio form, or any other appropriate form as well as visual form.

The generative AI engine may include multiple distinct generative models, for example a caption generating model, an image generating model, an audio generating model, a text generating model, video generating model, etc. A caption generating model may generate a caption for a frame/image associated with a memorable experience. The caption is a natural language description of the scene that is captured in the frame. For example, using the lunch example above, the caption may be "spicy lentils for lunch at Spicy Ranch Restaurant." There are a multitude of ways to generate the caption, but the similarity between them is to use generative AI to generate text that describes an image.

The image generating model may generate one or more plausible images based on an image and the sensor data associated with a memorable experience of a user. Although the ultimate output of this model is an image, it may take one or more other distinct inputs. In one example, the image generating model may take a human readable text prompt that describes the desired image. In another example the image generating model may take an image as an input plus a human readable text that describes how the image should be modified. In still another example, the image generating model may take a parameter that describes how much hallucination is permitted in generating one or more plausible images. In some examples, the image generating model will be used in conjunction with the caption generating model. For each plausible image generated, an associated caption will be generated that describes the plausible image.

An audio generating model may generate audio questions associated with a memorable experience as a challenge for a generative AI challenge-response. For instance, using the lunch example above, the audio generating model may generate the question "what did you eat for lunch?" that may be emitted from the speaker of a user device. The response may require the user speaking the answer "spicy lentils" into the microphone of the device. Alternately, options in the form of images (generated by the image generating model) may be displayed on a user interface for the user to select from. In another example, text description options (generated by the text generating model) may be displayed on a user interface for the user to select from (e.g., "spicy lentils", "spicy noodles" "lentil soup", "lentil salad", "noodle soup").

A text generating model may function similarly to the audio generating model. A question associated with a memorable experience may be displayed on a user interface as a challenge for a generative AI challenge-response. The response may require the user to text the correct answer into the user interface, speak the correct answer into a microphone, or select the correct answer from an array of images, or text options displayed on the user interface.

Although described herein in relation to network security, for example, for authorization for secure access to a network resource, the AI engine is not limited to this function and may be used in other fields. For example, the AI engine may be applicable to the filed of clinical and medical settings. For instance, the classifier does not have to be constrained to a simple binary distinction between memorable and unmemorable experiences. In can be trained to classify experiences as happy, sad, traumatic, anxiety-inducing, teachable, and so on. This information can then be utilized for patient evaluation and diagnosis. For example, take a user that has a fear of heights based on their past experiences. It is widely known that exposure therapy can be beneficial for people with various phobias. In this case, the generative AI engine can generate similar experiences, such as images of high-altitude setting, or virtual reality (VR) settings with high-altitude, and gradually expose the patient to them, helping to alleviate their phobia.

Furthermore, these concepts can be extended to personalize various aspects of people's lives. For instance, identifying the types of experiences or environments that are better suited for a user's learning needs, the user can be informed accordingly. In addition, the generative engine can be employed to create such settings. For example, if a student learns more effectively in a warm, well-lit, lively environment, the generative engine can mimic such a visual and auditory atmosphere and send a signal to an HVAC system to increase the temperature, thereby creating a more optimal and personalized learning environment for that user.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein that are directed to leveraging a memorable experience of a user for authorization and secure access to a network resource.

The architecture 100 includes a user 102 with a user device 104. In the illustrative example, the user device 104 represents a smartphone associated with the user 102. However, the user device 104 may be any type of electronic device capable of communicating data over a network. In architecture 100 the user device 104 is a device that is being used to attempt access to a secure resource, such as access to a network by the user 102. In addition, there are multiple sensors 106 that are associated with the user 102. In the illustrative example, the sensors 106 are shown as collecting data associated with time, location, user temperature, image capture, heartrate, and audio capture. The sensors may be standalone or a part of one or more smart devices (smartphone, smartwatch, smart glasses, etc.), they may be worn, carried, mounted on, or in some other way associated with the user 102 such that they are capable of collecting data associated with the user during real-world events in the day-to-day life of the user.

The architecture 100 also includes a time series database 108 for storing the data collected from the multiple sensors 106. The time series database 108 also stores the raw labels attached to the sensor data. The raw labels are those provided by a sensor itself (e.g., latitude and longitude information from a GPS). Additionally, the time series database determines, and stores inferred labels associated with the sensor data. For example, an inferred label may be associated with a mood of the user 102 such as happy, sad, angry, etc. that may be inferred from the user's voice heard by a microphone of a smartphone. Another example of an inferred label may be a description of an image capture from a camera or smart glasses, such as "looking at roses in the park." Note, because sensor hardware of the various multiple sensors 106 associated with a user 102 may have different sampling rates (e.g., a microphone may sample at 48 kHz, a video capture may be at 30 fps, etc.), interpolation may be performed to fill in gaps when one sensor has a sampling rate that is lower than another.

The time series database 108 also fuses the raw and inferred labels of multiple sensor data to form derived labels that describe a real-world event experienced by the user 102. For example, images from a camera (from smart glasses, or camera attached to a helmet, etc.), accelerometer data, heartrate data, and time (perhaps from a smart watch wore by the user 102) may be fused together to form the derived label "skydiving on Saturday." Derived labels are constructed by fusing data from multiple orthogonal sensing modalities. In addition, metadata from a camera may be appended to the derived tag to determine if the user 102 is alone or with one or more other people during the experience represented by the derived label. This metadata may assist in determining memorable experiences exclusively known to the user 102.

Architecture 100 also includes an AI engine 110 that leverages memorable experiences of the user 102 to generate a challenge-response to be used for authorization of the user 102 to access a network resource. The AI engine includes a classifier 112 whose primary role is to identify positive "memorable experiences" of the user 102 to be used as a memory biometric for multi-factor authentication. Once an event experienced by user 102 is classified by the classifier 112 as a memorable experience for the user 102, the memorable experience+caption 114 (e.g., the skydiving memory described above with the caption "skydiving on Saturday") can be used by a generative AI challenge-response system 116 to generate a MFA challenge-response to authorize the user 102 to access a network resource. A generative model 118 is used to generate multiple other plausible experiences that are similar to the real-world memorable experience but that the user 102 will know are not real. Finally, architecture 100 include an authentication function 120. The authentication function may include an authentication server, such as RADIUS, and communicate with the user device 104, the challenge-response system 116, and a secure network resource that the user 102 is attempting to access with the user device 104.

An example of how architecture 100 may function to use a memorable experience of user 102 as biometric MFA for access to a network resource may begin at (1) where the user 102 requests access to a network resource via the user device 104. For example, the user 102 inputs their credentials such as username and password into a login screen of a user interface of user device 104. At (2) the user credentials are sent to an authentication server (e.g., RADIUS or equivalent) for verification. At (3) if the user credentials are correct, the authentication function 120 will request a generative AI challenge-response for MFA and send parameters for the generative AI challenge-response generation to the AI engine 110. The parameters may include a level of hallucination for plausible events generation, a challenge-response type, and may depend on the device posture of device 104.

Previous and/or concurrently, at (4) the multiple sensors 106 associated with the user 102 collect data during real-world events experienced by the user 102. At (5) the sensor data with raw and inferred labels (as described above) is stored in the time series database 108. At (6) labels from multiple individual data streams are fused to form derived labels that describe a real-world event experienced by the user 102. At (7) a classifier 112 identifies which derived labels represent memorable experiences for the user 102.

Once the challenge-response system 116 of the AI engine receives the parameters for challenge-response generation from the authentication function 120, at (8) the challenge-response system 116 sends the parameters received from the authentication function 120 to a generative model 118 to determined one or more plausible events. At (9) the generative model 118 generates one or more plausible events based on a memorable event (determined by the classifier 112), the time series sensor data associated with the memorable event and received from the time series database 108, and the parameters. Once the generative model 118 generates the plausible events, at (10) the plausible events are sent to the challenge-response system 116 where the challenge-response systems 116 generates a challenge-response to be used for the MFA to grant the user 102 access to the network resource as requested in step (1). At (11) the challenge-response system 116 generates the challenge-response that includes the real-world memorable experience of the user 102 and one or more other plausible events similar to the real-world memorable experience but that the user 102 will know are not real. At (12) the challenge-response system 116 send the generative AI challenge-response to the authentication function 120 and the authentication function sends a challenge prompt to the user device 104 at (13). When the user 102 receives the challenge prompt via the user device 104, the user 102 respond at (14) and if the response sent is correct, the user 102 is granted access to the network resource. If the user 102 responds incorrectly, the user 102 is denied access to the network resource.

Figure 2:
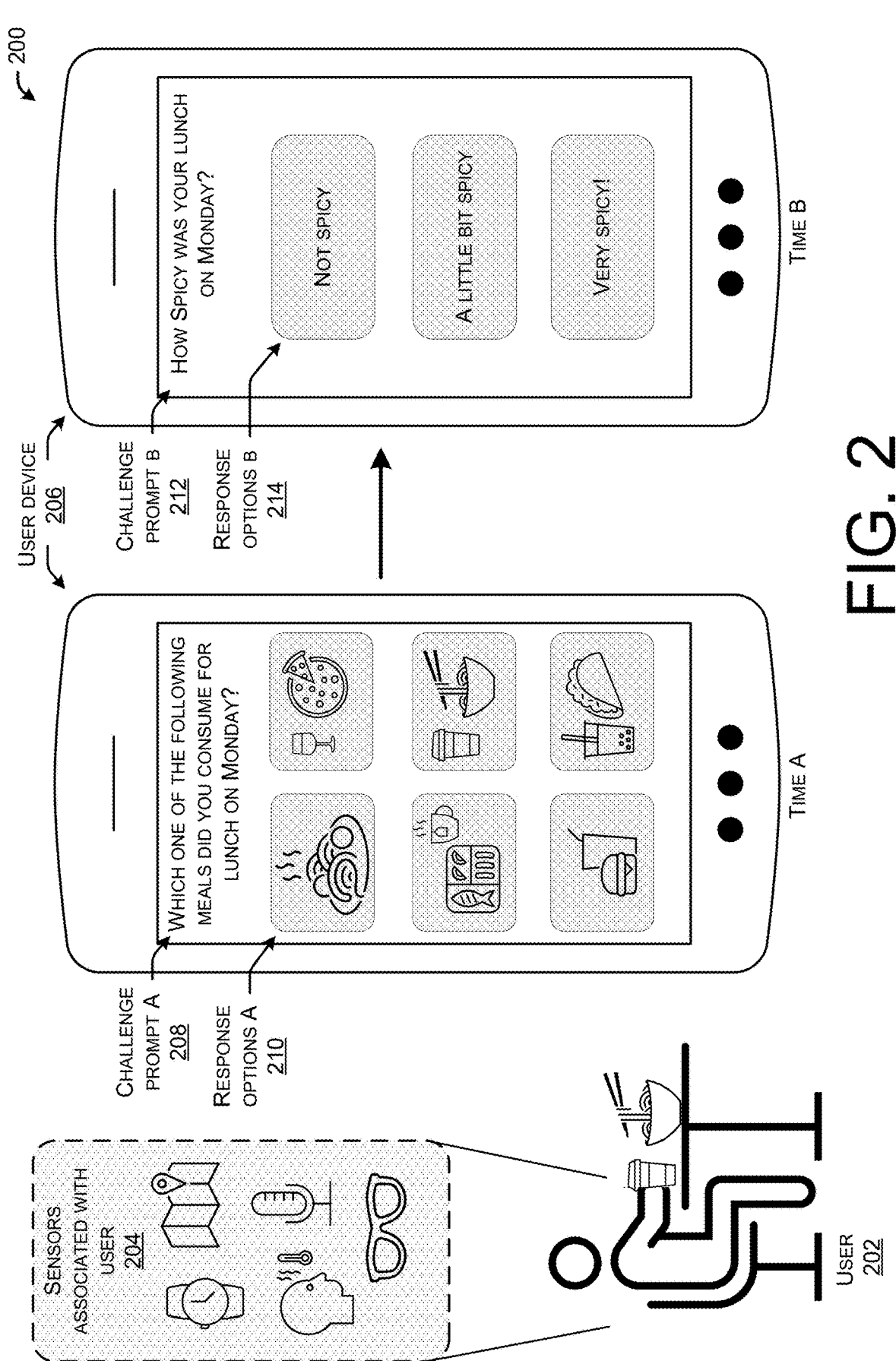
FIG. 2 illustrates an example of a memorable experience of a user, determined using sensor data associated with the user, incorporated into a visual challenge prompt along with various AI generated images of plausible experiences.

FIG. 2 illustrates an example 200 of a memorable experience of a user determined using sensor data associated with the user and incorporated into visual challenge prompts for MFA. Example 200 includes a user 202 enjoying a meal while multiple sensors associated with the user 204 collect data as the user experiences the real-world event of consuming their meal, that consists of very spicy noodles and coffee. The sensors associated with the user 204 shown in example 200 are a smart watch that indicates the time when the user typically eats lunch on a Monday, a location tracker (e.g., GPS) that indicates the user 202 is located at a restaurant, a sweat and/or temperature sensor, a microphone that can record speech of the user 202 while consuming their lunch, and smart glasses that can capture first person images of what the user 202 can see.

Let's say that this is the first time that user 202 has eaten at this particular restaurant for lunch and that the spicy noodles the user 202 costumes are the spiciest they have eaten, or at least the spiciest in a very long time, as indicated by the data collected from the sensors associated with the user 204 (e.g., sweat sensors, microphone recording speech from user 202 indicating "wow, I've never eaten such spicy noodles!", etc.). Thus, this real-world event of the user 202 consuming spicy noodles and coffee for lunch at a new restaurant on Monday, is a memorable experience for the user 202 as determined by a classifier of an AI engine as described above with reference to FIG. 1 and described in additional detail below with reference to FIG. 4.

Example 200 also include a user device 206. The user device 206 is shown at a first time, time A and later at a second time, time B for this example. The user device 206 illustrates two different challenge prompts, which may be used as a memory biometric MFA for access to a network resource, as generated by an AI engine as described above with reference to FIG. 1 and describes further below with reference to FIG. 5.

Continuing with our example, assume later on Monday (after user 202 has eaten the spicy lunch) or perhaps even sometime Tuesday (when the very spicy noodles are still remembered), user 202 attempts to log into a network. Because the user device 206 supports generative AI challenge-responses for MFA, the user device 206 may display challenge prompt A 208 along with response options A 210 at a first time, time A. Response option A 210 include the real answer to challenge prompt A 208, which as user 202 will know, is noodles and coffee. The response options A 210 also include multiple other plausible options that are generated by a generative model as described above with reference to FIG. 1 and described further below with reference to FIG. 5. In some examples, if user 202 responds to challenge prompt A 208 correctly, user 202 may be granted access to the network they have requested to join. In other examples, (e.g., based on device posture) once user 202 answers challenge prompt A 208 correctly, to ensure that user 202 is really who they say they are, an additional second challenge prompt B 212 along with response options B 214 may be displayed in the user interface of user device 206 at a subsequent time, time B. Based on the real-world event of user 202 eating the very spicy noodles for lunch on Monday (as determined by the sensors associated with user 204), user 202, and only user 202, will know that the noodles they consumed on Monday for lunch were extremely spicy to them and user 202 will know to select Very Spicy! as the correct response option. In still another example, challenge prompt A 208 and response options A 210 may not be used at all, and only challenge prompt B 212 and response options B 214 may be used as a memory biometric for MFA. Example 200 illustrates how a memorable experience may be used as a memory biometric for MFA using a text prompt and image response options at time A and/or a text prompt and text response option at time B. However, this is by example and not limitation, other types and combinations of challenge prompts and response types may be used such as audio, as illustrated and described with reference to FIG. 3.

Figure 3:
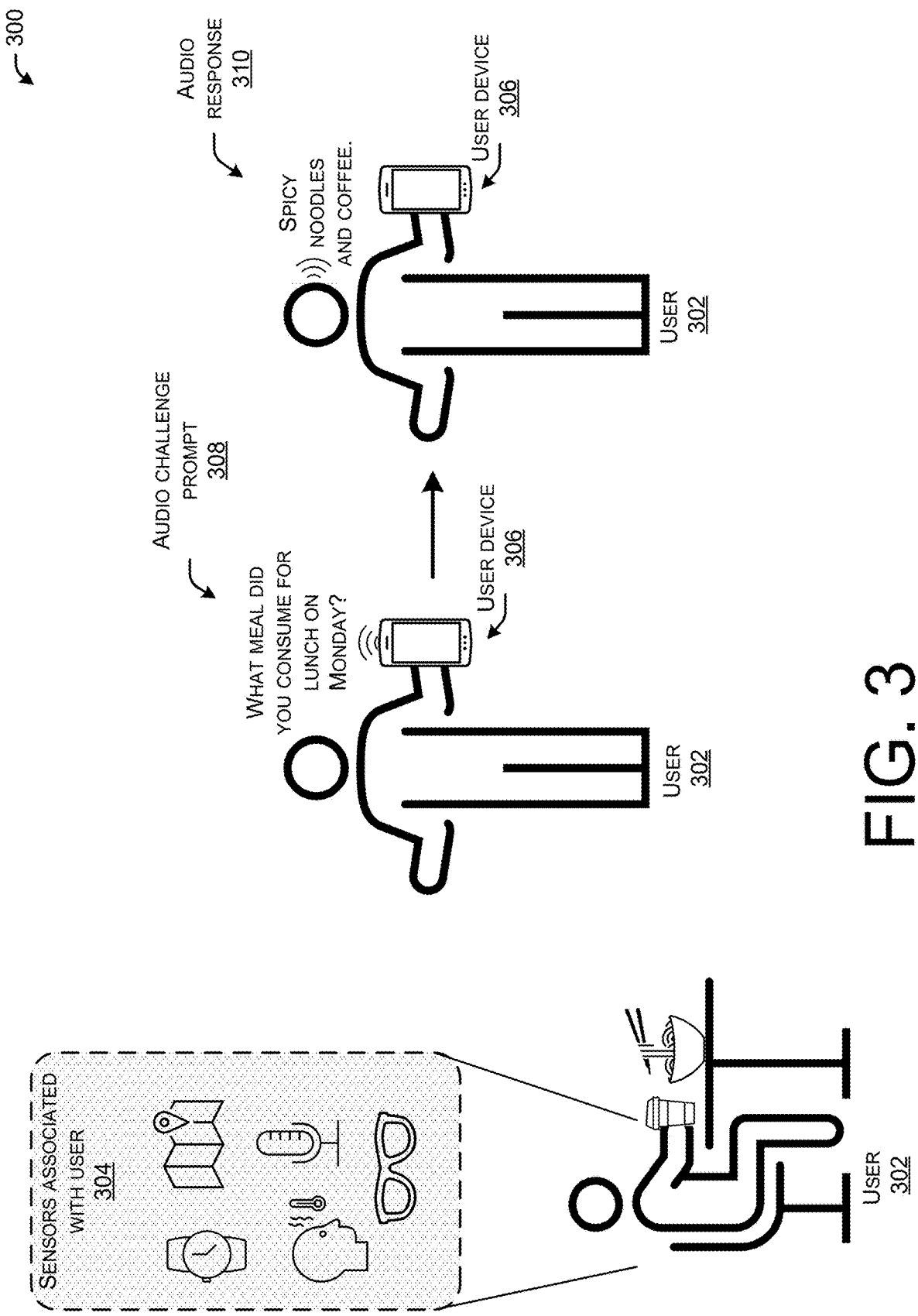
FIG. 3 illustrates an example of an audio challenge prompt based on a memorable experience of user that is determined using sensor data associated with the user.

FIG. 3 is similar to FIG. 2 in that is illustrates an example 300 where a user 302 is consuming spicy noodles and coffee for lunch on Monday, and sensors associated with user 304 collect data associated with user 302 during the event. At a later time when user 302 attempts to access a network resource (e.g., join a network) via a user device 306, example 300 illustrates an audio challenge prompt 308 for a memory biometric MFA. The audio challenge prompt 308 emits the audio challenge prompt 308 "what meal did you consume for lunch on Monday?" from the speaker of the user device 306. In response the user 302 speaks the audio response 310 "spicy noodles and coffee" into the microphone of the user device 306. Any appropriate combination of challenge-response types may occur, such as but not limited to visual images, visual text, audio, haptic, video, etc. For example, in the real-world event of a visually impaired user attending a concert, a memorable event for this user may be a specific song which is played during the concert because it has some personal or sentimental meaning to the user. A challenge response may use an auditory or tactile (e.g., braille) interface to query the user about the song. In another example, the challenge response may be the actual song as well as one or more plausible songs that are presented to the user during the challenge, and the user will know which song is the one that is the real-world memorable event.

Figure 4:
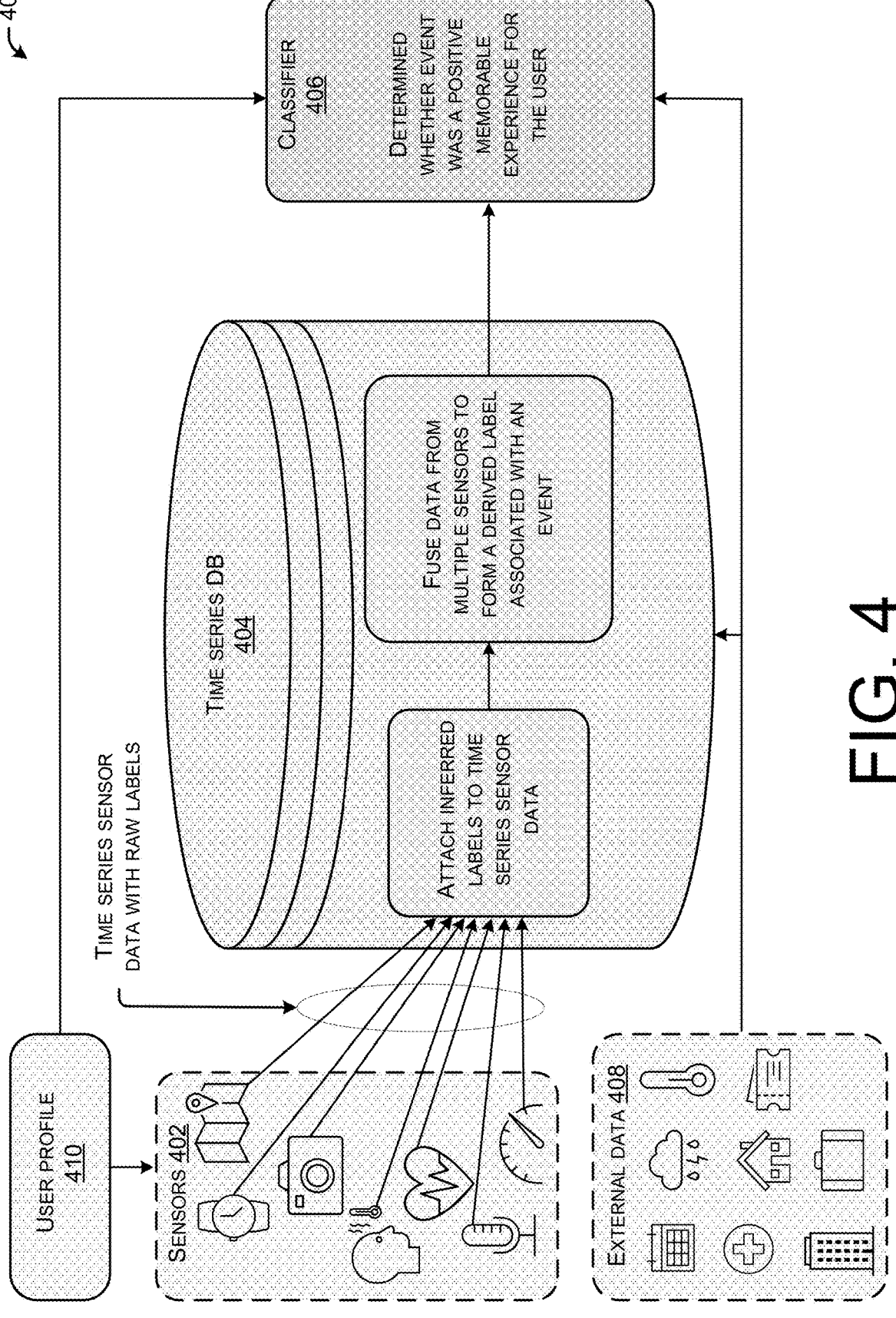
FIG. 4 illustrates an example architecture that may implement various aspects of the technologies directed to determining whether an event experienced by a user is a positive memorable experience for the user.

FIG. 4 is an example architecture 400 that may implement various aspects of the technologies described herein that are directed to determining whether an event experienced by a user is a positive memorable experience for the user. The example architecture 100 includes multiple sensors 402. The sensors 402 may be worn, mounted on, carried by, or in some other appropriate way associated with a specific user. The sensors 402 capture events experienced by the user by collecting data that gives a reasonably complete picture of the user's many daily experiences by tracking the user's physical activity, biomarkers, vital signs, interactions with other people or physical spaces the user occupies, etc. Although architecture 400 illustrates a limited number of sensors, these are examples of some of the many sensors that may be employed to implement the various techniques described herein are not meant to be limiting. The sensors 402 that may be used to track a user's daily experiences may include but are not limited to cameras, microphones, heart rate monitors, GPS, IMU sensors, barometer, ambient light sensor, skin temperature sensor, SpO2, iris scanner, sleep tracker, etc. The sensors 402 produce a reasonably complete picture of the user's unique daily experiences. The data collected by the sensors 402 includes a raw label provided by the sensor. The raw label indicates what the data actually is (e.g., beats per minute from a heartrate monitor).

Architecture 400 also includes a time series database 404. The time series sensor data, including the raw label pf each of the multiple individual sensors associated with each individual data stream, is sent to the time series database for storage. The time series database may attach one or more inferred labels to each time series sensor data stream from each sensor 402 during a particular event experience by a user. The inferred labels may, for example, be a scene recognition from a first-person camera view of an event (e.g., "planting seeds in a garden") or a description of the user's mood (e.g., happy, sad, angry, scared, etc.) inferred by one or more sensors (e.g., tone of voice picked up by a microphone) or any appropriate label describing an aspect of an event experienced by a user that may be "inferred" from the time series sensor data received from the sensors 402.

The next step in determining whether an event experienced by a user is a positive memorable experience for the user is data fusion. The time series database 404 fuses labels (raw and inferred) from multiple sensors together to from derived labels. The derived labels are constructed by fusing data from multiple sensors 402 from a time period the user experienced an event. An example of a derived label may be "coffee with fiancé at an outdoor café." This example of a derived label may be a fusion of sensor data from an image capture sensor, GPS, ambient light sensor, microphone, etc. In addition, to the time series sensor data received from the sensors 402, the time series database may also receive external data 408 that is associated with the user. For instance, in the derived label example above of "coffee with fiancé at an outdoor café," a user's calendar may have an appointment for the time and place with "fiancé" that can contribute to constructing derived labels for an event. External data 408 may include but is not limited to, personal calendars, weather information, ambient temperature, event tickets a user has purchased, restaurant or other reservations, tickets or reservations relating to travel, class schedules, employment schedules, etc. Information relating to whether the user is alone or with other people (as determined from the time series sensor data) may be appended as metadata to a derived tag. This information may assist in identifying memorable experiences unique to a user for authentication purposes.

Once the derived labels have been constructed, a classifier 406 is used to determine whether an event experienced by a user is a "memorable" experience for the user. Numerous techniques may be employed to perform this classification. In a first technique, for each identified label, a look back in a window of time is performed to see if the event has previously occurred. This may be done by mapping labels to a vector space, and identifying sparse/singleton clusters. As proximity in vector space denotes proximity in semantic meaning of the label, looking at sparse/singleton clusters shows infrequent labels that may be tagged as "memorable." Another technique is to pass the series of labels within a window of time (e.g., a current day, week, etc.) into a neural network that is trained to identify "memorable events" from labels. The top-k outputs of this neural network lists a set of memorable events with a weight (probability a human remembers the event) associated with the same. In still another example, raw sensor data streams are directly passed into a neural network that is trained to identify memorable events, which may mitigate the loss in information due to labeling.

Some events, although "memorable," may be undesirable for use as a memory biometric for multi-factor authentication of a user. For example, when a person's dog dies, there is a very high probability that the event is memorable but is also traumatic, thus is not an acceptable "memorable" event for authentication purposes. Thus, Reinforcement Learning from Human Feedback (RLHF) may be relied upon to weed out memorable but traumatic events. This technique relies on the usage of human feedback to steer a model into picking content that is not traumatic. In this way, only memorable experiences that have positive moods or emotions connected to them for a user will be classified by the classifier 406 as "memorable."

Furthermore, some events may be memorable but not appropriate for authentication purposes as the event has privacy concerns associated with it (e.g., HIPPA). Thus, there may be times that sensors 402 do not collect data. For instance, when a user is in a medical clinic, the collection of data may be restricted. Thus, when a GPS senses a user is in a medical location, all other sensors are turned off. Alternately or in addition, if an external personal calendar indicates a user has a medial appointment for a certain time window, all sensors are turned off during the time window. Any event that has privacy concerns associate with it or is bound by privacy regulations will not be identified by the classifier 406 as a "memorable" experience.

Additionally, architecture 400 also includes a user profile 410. The user profile 410 defines the scope as to how the sensor data is utilized. The user profile may contain information associated with a specific user that steers when to (or when not to) collect sensor data, rules regarding categories that are appropriate (or not) to classify as "memorable" (e.g., do not use events involving my children as memorable events for authentication purposes, or do not use events involving work when I am on vacation). The user profile may include data associated with the user that has been gathered automatically, or manually input by the user. Additionally, the user profile 410 may consist of multiple profiles. For example, a user profile 410 may have a business profile and a personal profile, or any other appropriate profile that is differentiated in an acceptable way by the user. Each profile of the user profile 410 may identify the source for AI generated challenge responses, or data used for memorable event classification. For example, data collected at home may not be used for work related resource access authentication. Another example may be that data collected from personal devices may only be used for personal resource authentication. Profiles compartmentalize the data usage, and provide structure for when it is appropriate (or not) to use specific data for memorable event classification.

Figure 5:
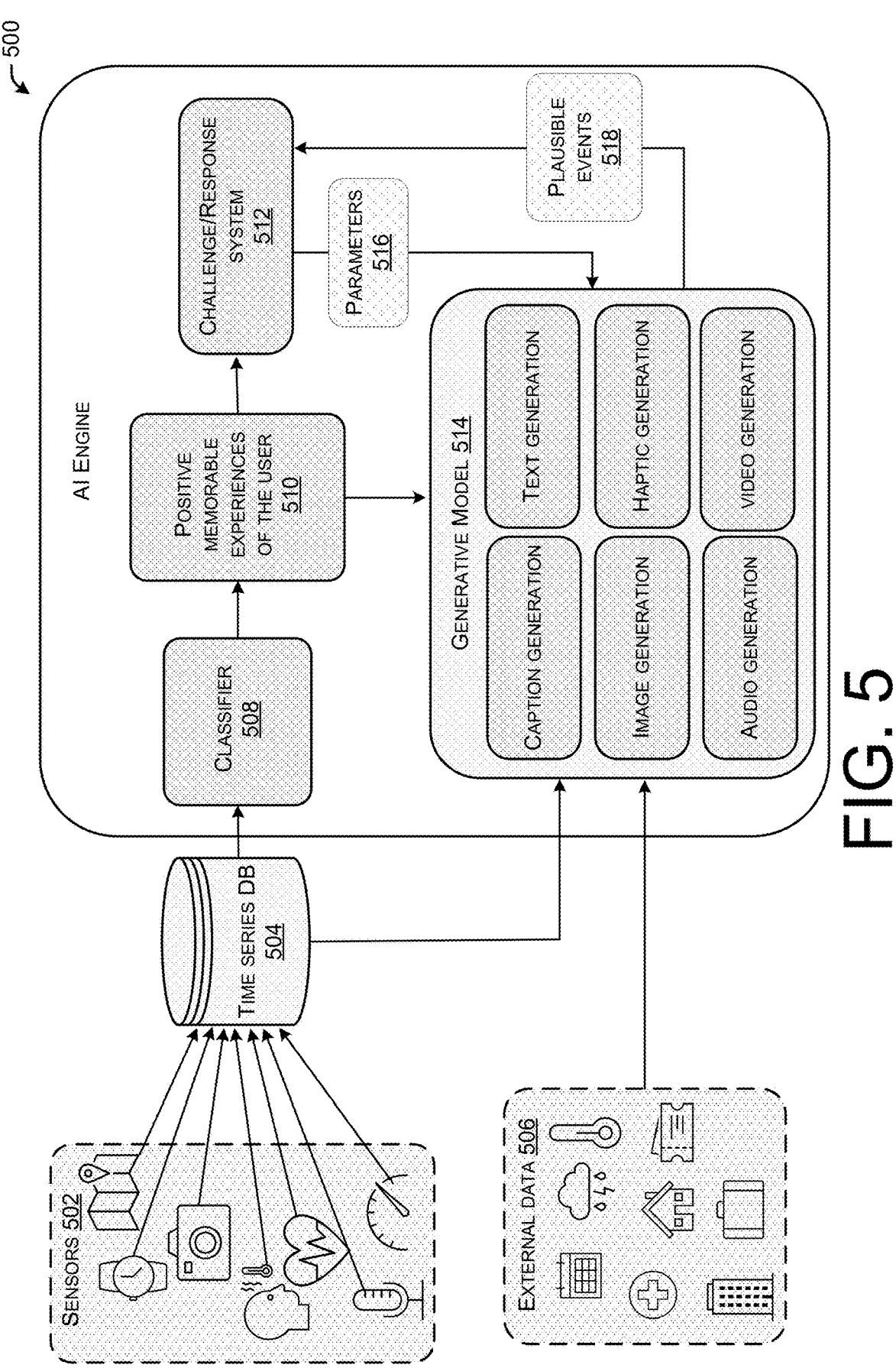
FIG. 5 illustrates and example architecture that may implement various aspects of the technologies directed to generating plausible events for use in a challenge-response for secure access to a network resource.

FIG. 5 illustrates an example architecture 500 that may implement various aspects of the technologies directed to generating plausible events for use in a generative AI challenge-response for secure access to a network resource. Similar to architecture 400 of FIG. 4, architecture 500 includes multiple sensors 502 for capturing events experienced by a user. Architecture 500 also includes a time series database 504 for storing the time series sensor data, attaching labels to data and fusing the data from multiple sensors together to construct derived labels. Also included in architecture 500 is external data 506 to assist with assigning inferred labels and constructing derived labels and classifying memorable events. A classifier 508 is also included in architecture 500 for determining whether an event experienced by a user is a positive memorable experience of the user 510 and appropriate for use as a memory biometric for multi-factor authentication.

Architecture 500 illustrates the classifier 508 as a part of an AI engine that also include a challenge-response system 512 and a generative model 514. The challenge-response system 512 communicates with an authentication function (as shown in FIG. 1) from which the challenge-response system receives parameters 516 for determining AI generated challenge-response pairs for authentication purposes. The generative model 514 may include multiple generative models that may be used according to a type of challenge-response requested by the authentication function, the type of challenge-response may be included in the parameters 516.

The generative model 514 is designed to serve needs of the challenge-response system 512. The challenge-response system 512 tells the generative model 514 which type of real-world memorable experience is to be used to generate a challenge-response prompt. The challenge-response system 512 also supplies the generative model with a level of hallucination to use to generate one or more other plausible experiences that are similar to the real-world memorable experience, but that the user will know are false. The generative model 514 has direct access to all the sensor data corresponding to the memorable experiences and stored in the time series database 504. The generative model 514 will selected a memorable experience according to type, from the experiences identified as memorable by the classifier 508, and generate multiple (the specific number as instructed by the challenge-response system 512) plausible events 518 and send them back to the challenge-response system 512. See FIG. 2 and FIG. 3 for examples of different types of generative AI challenge-responses and examples of plausible events.

The generative model 524 may include multiple distinct generative models, for example a caption generating model, an image generating model, an audio generating model, a text generating model, a video generating model, etc. A caption generating model may generate a caption for a frame/image associated with a memorable experience. The caption is a natural language description of the scene that is captured in the frame.

The image generating model may generate one or more plausible images based on an image and the sensor data associated with a memorable experience of a user. Although the ultimate output of this model is an image, it may take one or more other distinct inputs. In one example, the image generating model may take a human readable text prompt that describes the desired image. In another example the image generating model may take an image as an input plus a human readable text that describes how the image should be change. In still another example, the image generating model may take a parameter that describes how much hallucination is permitted in generating one or more plausible images. In some examples the image generating model will be used in conjunction with the caption generating model. For each plausible image generated, an associated caption will be generated that describes the plausible image.

An audio generating model may generate audio questions associated with a memorable experience as a challenge for a challenge-response. For instance, using the lunch example above, the audio generating model may generate the question "what did you eat for lunch?" that may be emitted from the speaker of a user device. The response may require the user speaking the answer "spicy lentils" into the microphone of the device. Alternately, options in the form of images (generated by the image generating model) may be displayed on a user interface for the user to select from. In another example, text description options (generated by the text generating model) may be displayed on a user interface for the user to select from.

A text generating model may function similarly to the audio generating model. A question associated with a memorable experience may be displayed on a user interface as a challenge for a challenge-response. The response may require the user to text the correct answer into the user interface, speak the correct answer into a microphone, or select the correct answer from an array of images, or text options displayed on the user interface.

Figure 6:
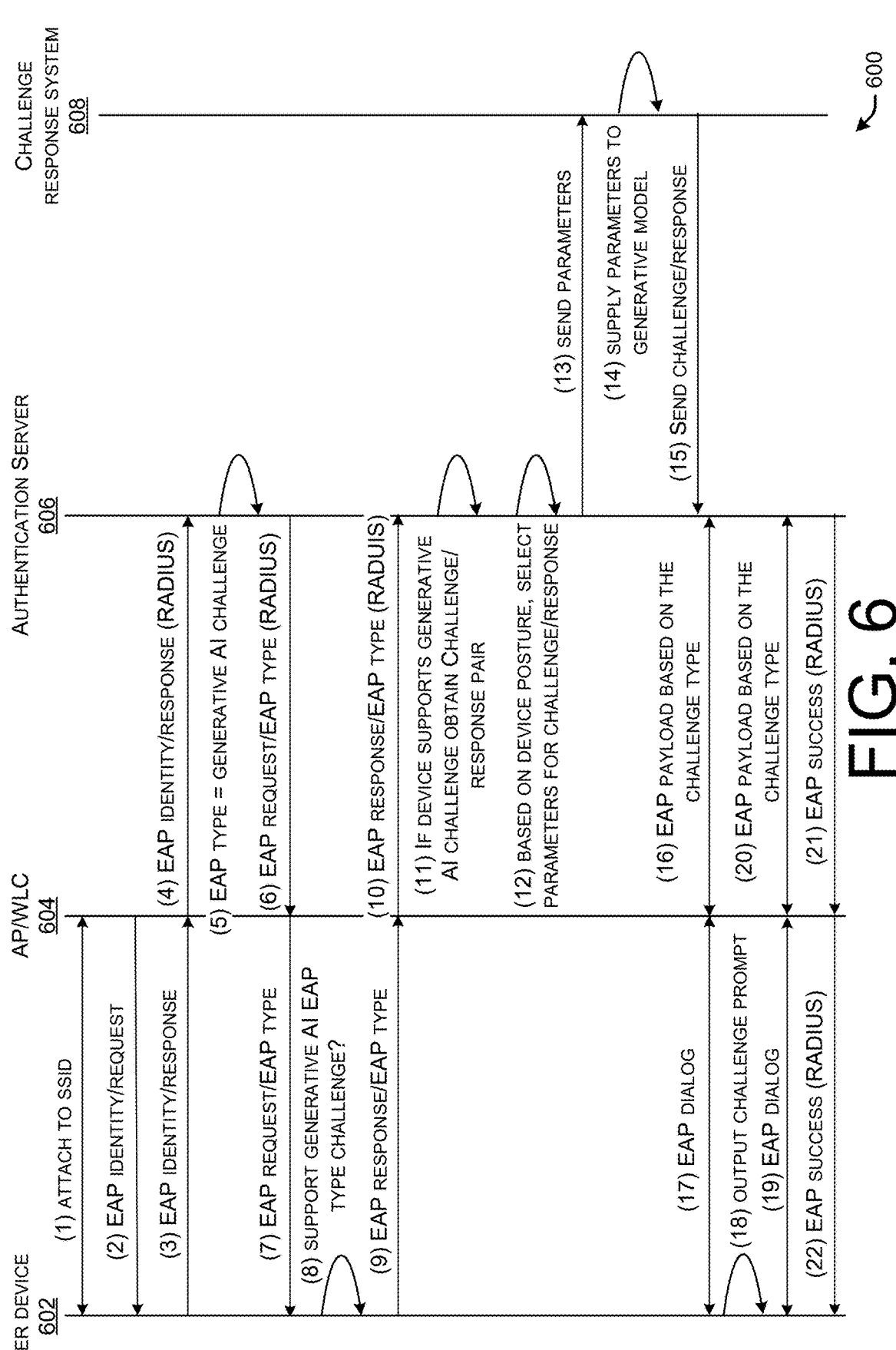
FIG. 6 illustrates an example of step-by-step communication for extending EAP for supporting generative AI challenges for secure access.

FIG. 6 illustrates an example step-by-step communication flow 600 for extending EAP to support generative AI Challenges. At (1) a user device 602 attaches to an SSID that the user device 602 is attempting to join. At (2) an access point or wireless LAN controller (AP/WLC) 604 or other access device, sends an EAP Identity/Request packet to ask for the user device 602 username. At (3) in response to receiving the EAP Identity/Request packet, the user device 602 sends the username in an EAP Identity/Response packet to the AP/WLC 604. At (4) the AP/WLC 604 relays the EAP Identity/Response to an authentication server 606 (e.g., RADIUS). At (5) The authentication server 606 determines a that a new EAP type generative AI challenge is available and send the AP/WLC 604 an EAP Request/EAP type packet to determine for determining if the user device 602 supports the new EAP type generative AI challenge at (6). The AP/WLC 604 relays the EAP request/EAP type packet to the user device 602 at (7). At (8) the user device 602 determines whether it supports the new EAP type generative AI challenge and if it does, the user device 602 responds with an EAP response/EAP type packet at (9) to the AP/WLC 604 and at (10) the AP/WLC 604 relays the information onto the authentication server 606 at (10). At (11) if the user device 602 supports the new EAP type generative AI challenge the authentication server 606 determines to obtain a challenge-response pair. At (12) based on the device posture of user device 602, the authentication server determines parameters for the challenge response. For example, the parameters may include a level of hallucination for generating plausible events and a challenge type (e.g., image, text, audio, etc.). At (13) the authentication server 606 sends the parameters to a challenge-response system 608 of a generative AI engine. At (14) the challenge-response system 608 supplies the parameters to a generative model of the generative AI engine and receives the challenge-response from the generative model. At (15) the challenge-response system 608 sends the challenge/response to the authentication server 606. At (16) the EAP payload is based on the challenge type (e.g., image, text, audio, etc.) At (17) the challenge-response is sent to the user device 602 (EAP dialog) and at (18) the challenge prompt is output by user device 602 (e.g., displayed on a user interface, or output as audio from a speaker, etc.). At (19) a user associated with the user device 602 inputs a response to the challenge prompt and the response is sent to the AP/WLC 604. At (20) the response is relayed to the authentication server and the EAP payload is based on the challenge type. If the authentication server 606 determines that the response received is correct, at (21) the authentication server sends a RADIUS EAP success packet to the AP/WLC 604 and the AP/WLC 604 sends an EAP success packet to the user device 602 at (22). Although described herein specifically for extending EAP to support generative AI challenges, the same or similar techniques may be used to extend any type of challenge and response handshake to be compatible with generative AI challenges. Thus, extending EAP to support generative AI challenges is by example and not limitation.

FIGS. 7-10 are flow diagrams illustrating example methods 700, 800, 900, and 1000 associated with the techniques described herein for collecting time series sensor data associated with a user during real-world events, identifying memorable experiences from the real-world events, using the time series sensor data associated with a memorable event to generate other plausible events, and using the memorable event and generated plausible events to generate a challenge-response for authorizing a user for secure access to a network resource. The logical operations described herein with respect to FIGS. 7-10 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 7-10 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7:
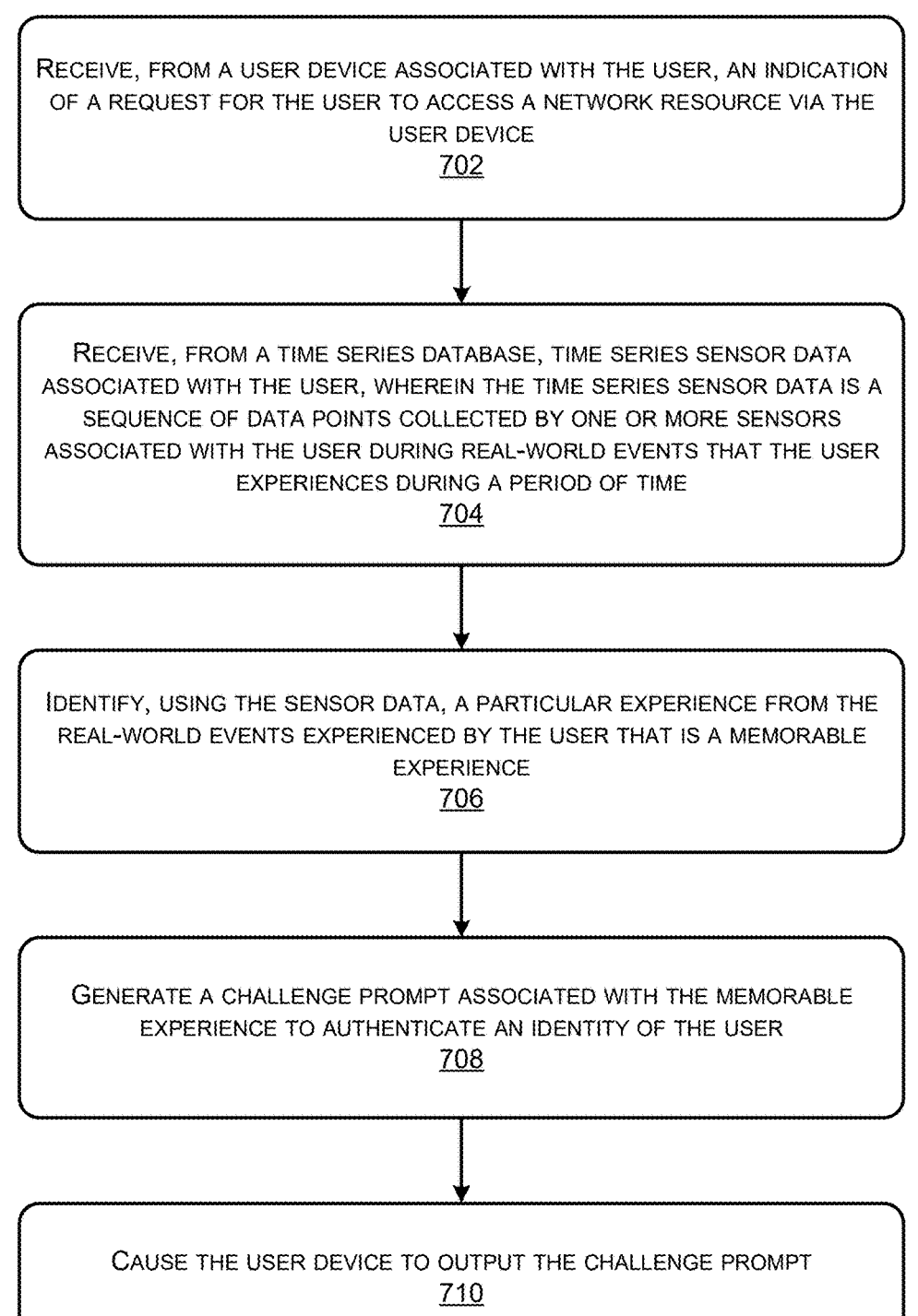
FIG. 7 is a flow diagram illustrating an example method associated with the techniques described herein for leveraging a memorable experience of a user for secure access to a network resource.

FIG. 7 is a flow diagram illustrating example method 700 for leveraging a memorable experience of a user as an authentication factor.

At operation 702, an indication of a request for a user to access a network resource via a user device associated with the user is received from the user device. For example, referring to FIG. 1 at (1) the user 102 logs in with their username and password via the user device 104 requesting access to a network resource. The user may be attempting to join a network, access a user account of an application, or access some other secured network resource.

At operation 704, time series sensor data associated with the user is received from a time series database. The time series sensor data is a sequence of data points collected by one or more sensors associated with the user during real-world events that the user experiences during a period of time. Referring again to FIG. 1, the sensors 106 that are associated with user 102, collect time series sensor data that is sent to the time series database 108.

At operation 706, using the sensor data, a particular experience from the real-world events experienced by the user, is identified as a memorable experience. Referring again to FIG. 1, the classifier 112 identifies which real-world events experienced by user 102 are memorable experiences for the user 102.

At operation 708, a challenge prompt associated with the memorable experience to authenticate an identity of the user is generated. Referring to FIG. 1, the generative model 118 generate plausible experiences that are similar to the real-world event experienced by the user 102, but that the user will know are false. These plausible experiences, along with the real-world memorable experience are used to generate a challenge-response prompt as a multi-factor authentication for authorization.

At operation 710, a challenge prompt is output on the user device. Referring to FIG. 1 again, the challenge prompt is sent from the authentication function 120 to the user device 104 at (13) and is output for the use 102 to respond to. For example, with reference to FIG. 2, challenge prompt A 208 along with the response options A 210 are displayed on the user device 206.

FIG. 8 is a flow diagram illustrating example method 800 for identifying an event as a memorable experience associated with a user.

At operation 802, during an event, a data stream from each of multiple user sensors associated with a user are received. Each individual data stream from each individual sensor has a raw label provided by the user sensor, each raw label indicating what data from the data stream represents. For example, with reference to FIG. 4, a data stream from each sensor 402 is sent to the time series database 404. Each data stream includes a raw label, for example beats per minute from a heartrate monitor.

At operation 804, an inferred label describing aspects of the event is associated with each user data stream. The inferred label indicates at least one of a positive or negative reaction experienced by the user, a description of a visual scene, or a description of environmental conditions received from an external source. With reference to FIG. 4, inferred labels are attached to the time series sensor data as shown.

At operation 806, using the raw label of each of the multiple individual sensors and inferred labels of the data stream from each of the multiple user sensors associated with the user during the event, a derived label is determined. The derived label describes an event experienced by the user. Referring again to FIG. 4, the labels from multiple sensors are fused together to construct a derived label associated with an event experienced by a user.

At operation 808, whether the event experienced by the user is a memorable event for the user is determined based at least in part on the derived label. In FIG. 4, the classifier 406 determines whether an event experienced by a user is a memorable event or not. In addition, the classifier weeds out events that are memorable but traumatic, as well as events that may be subject to privacy regulations or have other privacy concerns.

FIG. 9 is a flow diagram illustrating example method 900 for generating a challenge-response for secure access of a network resource using a memorable event and one or more other plausible events generated using generative AI.

At operation 902, information indicating a memorable event associated with a user is received from a classifier. For example, referring to FIG. 5 the classifier 508 identifies a positive memorable experience of the user 510 and send it to the generative model 514.

At operation 904, time series sensor data associated with the user for a period of time associated with the memorable event is received from a time series database. Referring to FIG. 5, the generative model 514 also receives time series sensor data associated with the memorable experience, identified in operation 904, from the time series database 504.

At operation 906, parameters for determining one or more plausible events that are similar to the memorable event are received from an authentication server. The parameters include a level of hallucination for generating the one or more plausible events. Referring to FIG. 1 parameters are sent from the authentication function 120 to the challenge-response system 116. The parameters are then sent to the generative model 118, or as shown in FIG. 5, the parameters 516 are sent from the challenge-response system 512 (that were received from the authentication server) to the generative model 514.

At operation 908, based at least in part on the memorable event, the time series sensor data, and the parameters, one or more plausible events are generated. Referring to FIG. 5, the generative model 514 generates multiple plausible event based on the parameters 516, the positive memorable experience of the user 510 and the time series sensor data received from the time series database 504.

At operation 910, using the memorable event and the one or more plausible events, a challenge and response to a be used as a challenge-response authentication for the user to access a network resource is generated. Referring to FIG. 5, once the plausible events have been generated the generative model 514 sends the plausible events 518 to the challenge-response system 512 to be forwarded to the authentication function as shown in FIG. 1.

At operation 912, the challenge and response are transmitted to the authentication server. Referring to FIG. 1, at (12) the challenge and response are sent to the authentication server of the authentication function 120.

FIG. 10 is a flow diagram illustrating example method 1000 for extending EAP for supporting generative AI challenges for secure access.

At operation 1002, an authentication server receives an indication of a request for a user account to access the network resource via a user device from a network resource. For example, referring to FIG. 6, at (4) the authentication server 606 receives an indication that the user device 602 is requesting to access a network resource.

At operation 1004, the authentication server determines that the user device supports generative AI challenge-response authentication. Referring again to FIG. 6, at (5) the authentication server asks if the user device 602 supports the generative AI challenge type and at (10) the authentication server 606 receives an indication that the user device 602 does support the generative AI challenge type.

At operation 1006, the authentication server determines a device posture of the user device. For example, referring to FIG. 6, at (12) the authentication server 606 determines the device posture of user device 602.

At operation 1008, based at least in part on the device posture, the authentication server determines parameters for generative AI challenge-response generation. The parameters include at least one of a level of hallucination for and a type of, challenge-response to generate. Referring to FIG. 6, based on the device posture determined at (12), the authentication server 606 determines parameters for the generative AI challenge-response.

At operation 1010, the authentication server transmits the parameters for generating the generative AI challenge-response to a generative AI engine. Referring to FIG. 6, at (13) the authentication server 606 sends the parameters for generating the generative AI challenge-response to the challenge-response system 608 of the generative AI engine (AI engine 110 as shown in FIG. 1).

At operation 1012, the authentication server receives the generative AI challenge-response for the user account to access the network resource via the user device from the generative AI engine. Referring to FIG. 6, at (15) the authentication server receives the generative AI challenge-response from the challenge-response system 608 or the AI engine (see AI engine 110 of FIG. 1).

At operation 1014, the authentication server causes a challenge prompt from the generative AI challenge-response to be output by the user device. Referring to FIG. 6, at (18) the generative AI challenge prompt is output on the user device 602. For example, see the challenge prompt A 208 and response options A 210 on user device 206 at time A of FIG. 2.

Figure 11:
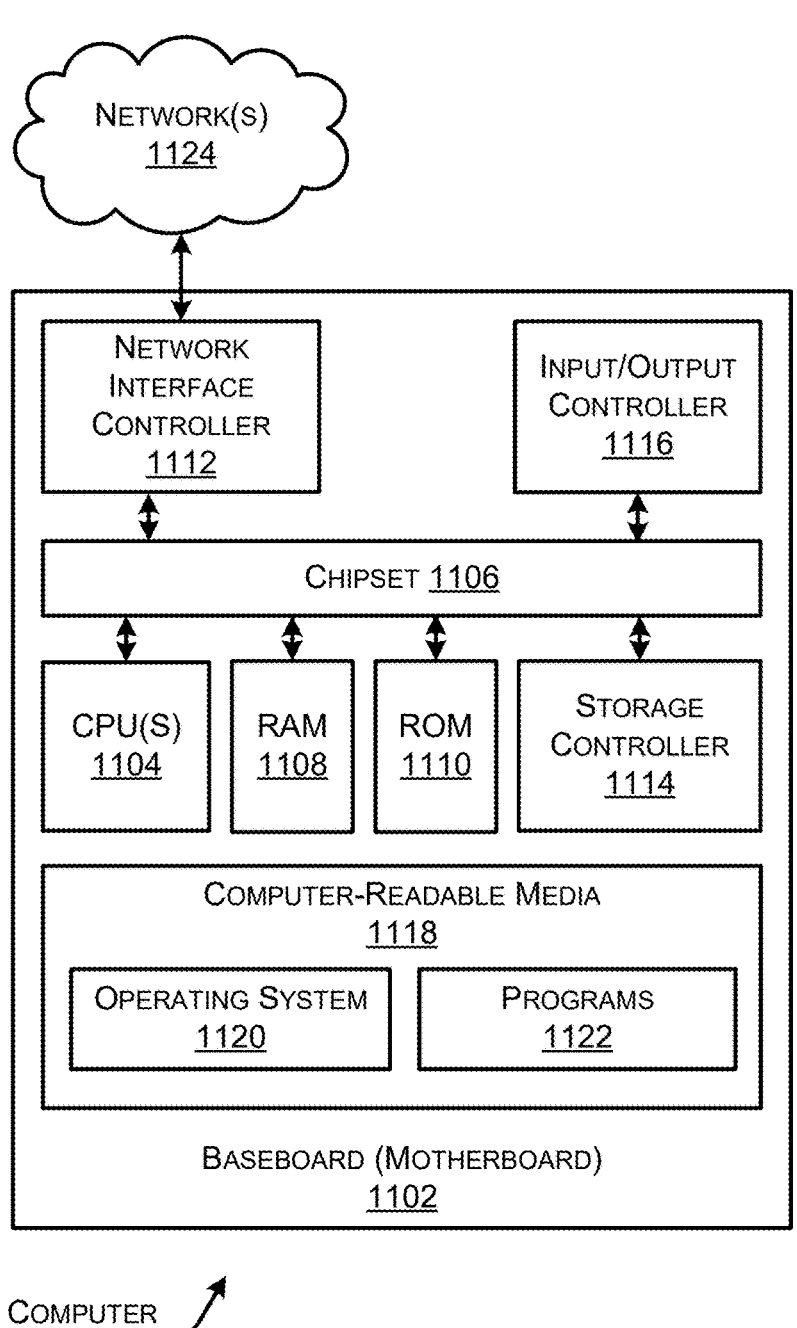
FIG. 11 is a computer architecture diagram showing an illustrative computer hardware architecture for implementing a computing device that can be utilized to implement aspects of the various technologies presented herein.

FIG. 11 is a computer architecture diagram showing an illustrative computer hardware architecture for implementing a computing device that can be utilized to implement aspects of the various technologies presented herein. The computer architecture shown in FIG. 11 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network. The chipset 1106 can include functionality for providing network connectivity through a NIC 1112, such as a gigabit Ethernet adapter. The NIC 1112 is capable of connecting the computer 1100 to other computing devices over the network 1124. It should be appreciated that multiple NICs 1112 can be present in the computer 1100, connecting the computer to other types of networks and remote computer systems. In some examples, the NIC 1112 may be configured to perform at least some of the techniques described herein.

The computer 1100 can be connected to a storage device 1118 that provides non-volatile storage for the computer. The storage device 1118 can store an operating system 1120, programs 1122, and data, which have been described in greater detail herein. The storage device 1118 can be connected to the computer 1100 through a storage controller

1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the architecture 100 and or any components included therein, may be supported by one or more devices similar to computer 1100. Stated otherwise, some or all of the operations performed by the architecture 100, and or any components included therein, may be performed by one or more computer devices 1100 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computer 1100.

In one embodiment, the storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes and functionality described above with regard to FIGS. 1-10, and herein. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

The computer 1100 may include one or more hardware processors (processors) configured to execute one or more stored instructions. The processor(s) may comprise one or more cores. Further, the computer 1100 may include one or more network interfaces configured to provide communications between the computer 1100 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1122 may comprise any type of programs or processes to perform the techniques described in this disclosure for using device proximity of a primary device and a secondary device to allow or deny connections to secured resource(s), as well as terminate existing connections to the secured resource(s).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for extending Extensible Authentication Protocol (EAP) for supporting generative AI challenge-responses and performed at least in part by an authentication server, the method comprising:

receiving, from a network resource, an indication of a request for a user account to access the network resource via a user device;

determining that the user device supports generative AI challenge-response authentication;

determining a device posture of the user device;

based at least in part on the device posture, determining parameters for generative AI challenge-response generation, the parameters including at least a level of hallucination;

transmitting, to a generative AI engine, the parameters for generating the generative AI challenge-response;

receiving, from the generative AI engine, the generative AI challenge-response for the user account to access the network resource via the user device; and causing a challenge prompt from the generative AI challenge-response to be output by the user device.

2. The method of claim 1 wherein the network resource is a wireless network and an authentication protocol used to connect the user device to the wireless network is an extensible authentication protocol (EAP) protocol.

3. The method of claim 1 wherein the parameters further include a type of challenge-response, and wherein the type of challenge-response parameter is at least one of image, audio, or text.

4. The method of claim 1 wherein the challenge-response is generated by the generative AI engine and based at least in part on a memorable event experienced by a user of the user account during a predetermined time period.

5. The method of claim 4 wherein the challenge prompt output by the user device is at least one of a set of images displayed on the user device, text in question form displayed on the user device, or audio in question form output from a speaker of the user device.

6. The method of claim 5 wherein the challenge prompt comprises a real visual image associated with the memorable event experienced by the user, and one or more plausible visual images generated by the generative AI engine and based at least in part on a hallucination parameter.

7. The method of claim 4 wherein the predetermined time period is a current day, and the challenge-response is based on a memorable event experienced by the user of the user account during the current day and prior to a current time.

8. A system comprising:

one or more processors; and one or more non-transitory computer-readable media storing instructions that, when executed, cause the one or more processors to perform operations comprising:

receiving, from a network resource, an indication of a request for a user account to access the network resource via a user device;

determining that the user device supports generative AI challenge-response authentication;

determining a device posture of the user device;

based at least in part on the device posture, determining parameters for generative AI challenge-response generation, the parameters including at least a level of hallucination;

transmitting, to a generative AI engine, the parameters for generating the generative AI challenge-response;

receiving, from the generative AI engine, the generative AI challenge-response for the user account to access the network resource via the user device; and causing a challenge prompt from the generative AI challenge-response to be output by the user device.

9. The system of claim 8, wherein the network resource is a wireless network and an authentication protocol used to connect the user device to the wireless network is an extensible authentication protocol (EAP) protocol.

10. The system of claim 8, wherein the parameters further include a type of challenge-response, and wherein the type of challenge-response parameter is at least one of image, audio, or text.

11. The system of claim 8, wherein the challenge-response is generated by the generative AI engine and based at least in part on a memorable event experienced by a user of the user account during a predetermined time period.

12. The system of claim 11, wherein the challenge prompt output by the user device is at least one of a set of images displayed on the user device, text in question form displayed on the user device, or audio in question form output from a speaker of the user device.

13. The system of claim 12, wherein the challenge prompt comprises a real visual image associated with the memorable event experienced by the user, and one or more plausible visual images generated by the generative AI engine and based at least in part on a hallucination parameter.

14. The system of claim 11, wherein the predetermined time period is a current day, and the challenge-response is based on a memorable event experienced by the user of the user account during the current day and prior to a current time.

15. One or more non-transitory computer-readable media storing instructions that, when executed, cause one or more processors to perform operations comprising:

receiving, from a network resource, an indication of a request for a user account to access the network resource via a user device;

determining that the user device supports generative AI challenge-response authentication;

determining a device posture of the user device;

based at least in part on the device posture, determining parameters for generative AI challenge-response generation, the parameters including at least a level of hallucination;

transmitting, to a generative AI engine, the parameters for generating the generative AI challenge-response;

receiving, from the generative AI engine, the generative AI challenge-response for the user account to access the network resource via the user device; and causing a challenge prompt from the generative AI challenge-response to be output by the user device.

16. The one or more non-transitory computer-readable media of claim 15, wherein the network resource is a wireless network and an authentication protocol used to connect the user device to the wireless network is an extensible authentication protocol (EAP) protocol.

17. The one or more non-transitory computer-readable media of claim 15, wherein the parameters further include a type of challenge-response, and wherein the type of challenge-response parameter is at least one of image, audio, or text.

18. The one or more non-transitory computer-readable media of claim 15, wherein the challenge-response is generated by the generative AI engine and based at least in part on a memorable event experienced by a user of the user account during a predetermined time period.

19. The one or more non-transitory computer-readable media of claim 18, wherein the challenge prompt output by the user device is at least one of a set of images displayed on the user device, text in question form displayed on the user device, or audio in question form output from a speaker of the user device.

20. The one or more non-transitory computer-readable media of claim 19, wherein the challenge prompt comprises a real visual image associated with the memorable event experienced by the user, and one or more plausible visual images generated by the generative AI engine and based at least in part on a hallucination parameter.

* * * * *